United States Patent [19]

Serdiuk

[11] Patent Number: 5,494,970

[45] Date of Patent: Feb. 27, 1996

[54] COATING COMPOSITION FOR A CLEARCOAT WITH IMPROVED SOLVENT AND ACID RESISTANCE

[75] Inventor: Paul Serdiuk, Warren, Mich.

[73] Assignee: BASF Corporation, Southfield, Mich.

[21] Appl. No.: 740,684

[22] Filed: Aug. 6, 1991

[51] Int. Cl.$^6$ .................................................. C08L 35/00
[52] U.S. Cl. ........................ 525/207; 525/208; 525/221; 525/256; 525/259; 428/500; 428/515
[58] Field of Search ................................... 525/207, 208, 525/221, 256, 259; 428/500, 515

[56] References Cited

U.S. PATENT DOCUMENTS

| | | | |
|---|---|---|---|
| 3,998,905 | 12/1976 | Labana et al. | 525/934 |
| 4,303,581 | 12/1981 | Levine et al. | 523/455 |
| 4,452,948 | 6/1984 | Marrion et al. | 525/223 |
| 4,598,015 | 7/1986 | Panush | 428/324 |
| 4,973,477 | 11/1990 | Isozaki et al. | 524/558 |
| 5,043,220 | 8/1991 | Shalati et al. | 525/108 |

OTHER PUBLICATIONS

Lee & Neville "Handbook of Epoxy Resins" pp. 158, 24–25 and 10–14.

*Primary Examiner*—Melvyn I. Marquis
*Assistant Examiner*—Randy Gulakowski
*Attorney, Agent, or Firm*—Anne Gerry Sabourin

[57] ABSTRACT

A coating composition for a clearcoat in a multilayer coating system for metallic substrates is described, comprising:

A) a resin with epoxy and hydroxy functionality;

B) a resin with anhydride functionality;

C) an aminoplast resin; and

D) additives selected from the group consisting of solvents, catalysts, flow agents, hindered amine light stabilizers, ultraviolet absorbers.

9 Claims, No Drawings

COATING COMPOSITION FOR A CLEARCOAT WITH IMPROVED SOLVENT AND ACID RESISTANCE

FIELD OF THE INVENTION

The present invention is directed to a coating composition for a clearcoat in a multilayer coating system for metallic substrates, more specifically, it is directed to a mixture of resins having epoxy and hydroxy functionality and resins having anhydride functionality crosslinkable with aminoplast resins as a coating composition for the preparation of clearcoats.

BACKGROUND OF THE INVENTION

Multilayer coating systems are well known in the automotive coating industry. These coating systems comprise a pigmented basecoat and a clear topcoat. In U.S. Pat. No. 4,598,015 are described a number of basecoat-clearcoat systems, in which both the basecoat and the clearcoat are pigmented in order to be aesthetically pleasing as well as durable.

The U.S. Pat. No. 4,728,543 discloses a clear topcoat composition of a film-forming acrylic polymer having a plurality of cross-linkable functional groups, solvents, a cross-linking agent and microgel particles. But these systems do not meet all requirements of the automotive industry for the topcoat in terms of mechanical properties, more specifically in terms of solvent resistance and acid resistance.

An object of the present invention is to provide a multilayer coating system for the automotive coating industry which includes a topcoat which exhibits superior solvent resistance, acid resistance and hardness compared to the acrylic/melamine clearcoats of the Prior Art.

SUMMARY OF THE INVENTION

The object of the present invention is achieved with a coating composition comprising A) a resin with epoxy and hydroxy functionality B) a resin with anhydride functionality C) an aminoplast resin and D) additives selected from the group consisting of solvents, catalysts. Additives selected from the group consisting of solvents, catalysts, flow agents, hindered amine light stabilizers, ultraviolet absorbers.

DETAILED DESCRIPTION OF THE INVENTION

Suitable resins (A) for the preparation of the coating composition of the present invention are polyacrylate resins having epoxy and hydroxy functionality. These polyacrylate resins are obtainable by polymerizing $a_1$) about 5 to about 80% by weight of an ethylenically unsaturated monomer having an epoxy group $a_2$) about 5 to about 60% by weight of an ethylenically unsaturated monomer having a hydroxy group $a_3$) about 20 to about 90% by weight of other ethylenically unsaturated monomers.

Preferred polyacrylate resins (A) comprise $a_1$) about 10 to about 60% by weight of an ethylenically unsaturated monomer having an epoxy group $a_2$) about 20 to about 50% by weight of an ethylenically unsaturated monomer having a hydroxy group $a_3$) about 30 to about 80% by weight of other ethylenically unsaturated monomers.

Most preferred polyacrylate resins (A) comprise $a_1$) about 15 to about 25% by weight of an ethylenically unsaturated monomer having an epoxy group $a_2$) about 30 to about 40% by weight of an ethylenically unsaturated monomer having a hydroxy group $a_3$) about 40 to about 60% by weight of other ethylenically unsaturated monomers.

Suitable ethylenically unsaturated monomers having an epoxy group ($a_1$) are selected from the group consisting of glycidylacrylate, glycidylmethacrylate or mixtures thereof.

Suitable ethylenically unsaturated monomers having a hydroxy group ($a_2$) are selected from the group consisting of hydroxyethylacrylate, hydroxyethylmethacrylate, hydroxypropylacrylate, hydroxypropylmethacrylate, hydroxybutylacrylate, hydroxybutylmethacrylate or mixtures thereof.

The other ethylenically unsaturated monomers ($a_3$) may be chosen from acrylic or methacrylic alkyl ester derived from alcohols having 1 to about 20 carbon atoms, or vinyl monomers. The expression (meth) acrylate with parenthesis as used herein includes methacrylate and acrylate. Suitable examples are methyl(meth)acrylate, ethyl(meth)acrylate, propyl(meth)acrylate, n-butyl(meth)acrylate, isobutyl(meth)acrylate, tert.-butyl (meth)acrylate and 2-ethylhexyl(meth) acrylate, maleic acid or fumaric acid dialkylesters in which the alkyl groups have 1 to 20 carbon atoms, vinylaromatics such as styrene, alpha-methylstyrene, vinyltoluene, tert.-butylstyrene, halogenated vinylbenzenes such as chlorostyrene, and other monomers like vinylchloride, (meth)acrylamide and (meth)acrylonitrile.

Preferred monomers ($a_1$), ($a_2$) and ($a_3$) are glycidyl methacrylate, hydroxy ethyl acrylate, hydroxy propyl acrylate, hydroxy butyl acrylate, methyl(meth)acrylate, butyl(meth)acrylate, ethylhexyl(meth) acrylate.

Suitable resins (B) are polyacrylate resins having anhydride functionality obtainable by polymerizing $b_1$) about 1 to about 50% by weight of an ethylenically unsaturated monomer having an anhydride group $b_2$) about 50 to 99% by weight of other ethylenically unsaturated monomers.

Preferred polyacrylate resins (B) comprise $b_1$) about 20 to about 40% by weight of an ethylenically unsaturated monomer having an anhydride group $b_2$) about 60 to about 80% by weight of other ethylenically unsaturated monomers.

Most preferred polyacrylate resins (B) comprise $b_1$) about 25 to about 35% by weight of an ethylenically unsaturated monomer having an anhydride group $b_2$) about 65 to about 75% by weight of other ethylenically unsaturated monomers.

Suitable ethylenically unsaturated monomers having an anhydride group ($b_1$) are selected from the group consisting of maleic anhydride, itaconic anhydride or mixtures thereof. Preferred is maleic anhydride.

Other ethylenically unsaturated monomers ($b_2$) comprise the ones described under the monomers ($a_3$) and additionally acrylic and methacrylic acid.

Preferred are acrylic or methacrylic acid, methyl(meth)acrylate, butyl(meth)acrylate, ethylhexyl(meth)acrylate and mixtures thereof.

In order to produce the polyacrylic resins (A) and (B) copolymerization of the described monomers is carried out using conventional techniques such as heating the monomers in the presence of a polymerization initiating agent and optionally chain transfer agents. The copolymerization is preferably carried out in solution.

Suitable solvents for solution polymerization are ethylene glycol or propylene glycol and their derivatives, such as dipropylene glycol monomethylether and ethylene glycol monobutyl etheracetate; alcohols, such as butyl alcohol and diacetone alcohol; ketones, such as methyl propyl ketone, methyl amyl ketone and acetone; esters, such as butyl acetate, and pentyl propionate; ethers, such as dioxane and tetrahydrofuran; aromatic solvents, such as xylene, toluene, and aromatic solvent blends; and mixtures thereof.

Typical initiators are peroxides such as dialkylperoxides, peroxyesters, peroxydicarbonates, diacylperoxides, hydroperoxides, and peroxyketals and azo compounds such as 2,2'-azobis (2-methylbutanenitrile) and 1,1'-azobis (cyclohexanecarbonitrile).

Typical chain transfer agents are mercaptans such as octylmercaptan, n- or tert.-dodecylmercaptan; halogenated compounds; thiosalicylic acid, mercaptoacetic acid, mercaptoethanol, buten-1-ol, and dimeric alpha-methylstyrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The polyacrylate has a weight average molecular weight of from about 2,000 to about 40,000, preferably from about 2,000 to about 25,000. The theoretical Tg of the polyacrylate (A) is from about −15° C. to about 30° C., preferably from about −5° C. to about 20° C. The theoretical Tg of the polyacrylate (B) is from about 10 to about 100° C., preferably from about 30° C. to about 70° C.

The aminoplast resin (C) is comprised of a nucleus or nuclei of acetoguanamine, benzoguanamine, adipoguanamine, or melamine, with the preferred being melamine. The aminoplast resin is considered to be fully aklylated, or substantially completely methylolated and subsequently substantially fully etherified with alcohol, with the number of alkyloxymethyl groups ranging from 2n−2 to 2n where n is the number of amino groups on the triazine ring. The preferred degree of polymerization of this aminoplast is from 1 to 3.

Suitable additives (D) are selected from the group consisting of solvents, catalysts, flow modifying agents, ultraviolet absorbers, hindered amine light stabilizers, and mixtures thereof.

Suitable solvents for the coating composition are conventional solvents used in the coating industry for dissolving vehicle resins. Examples thereof include aliphatic hydrocarbons such as hexane and heptane; aromatic hydrocarbons such as toluene, and xylene; various petroleum fractions having a suitable boiling point range; esters such as butyl acetate, ethylene glycol diacetate and 2-ethoxyethyl acetate; ketones such as acetone, methyl ethyl ketone and methyl isobutyl ketone; alcohols such as butanol and mixtures of these solvents. Preferred solvents are xylene, butyl acetate, ethylethoxy propionate and mixtures thereof.

Suitable catalysts are amine blocked sulfonic acids, phenyl acid phosphate (PAP), triphenyl phosphine, 1,4-diazobicyclo[2.2.2]octane (DABCO), AC-8 from Acids and Anhydrides Inc. Preferred are amine blocked p-toluene sulfonic acid (p-TSA), amine blocked dodecylbenzene sulfonic acid (DDBSA).

For the preparation of the coating composition all components were mixed together in a range of from about 10 to about 35% by weight, preferably from about 15 to about 25% by weight of component (A), from about 50 to about 75% by weight, preferably from about 55 to about 60% by weight of component (B), from about 5 to about 20% by weight, preferably from about 10 to about 15% by weight of component (C), from about 1 to about 15% by weight, preferably from about 5 to about 12% by weight of component (D).

The solid content of the final coating composition is from about 40 to about 60% by weight, preferable from about 50 to about 60% by weight. The viscosity is 18–30 seconds #4 Ford Cup, preferable 22–28 seconds #4 Ford Cup.

This coating composition is applied on a conventional basecoat used in the coating industry, especially on high solids solvent-borne and water-borne basecoat, by conventional methods, especially by brushing, roller coating, calendering, dip coating, flow coating or air atomizing, in a thickness of the film of about 0.5 to 2.2 mils, preferably 1.2 to 1.9 mils.

The multilayer coating is then cured or dried at temperatures of 100° to 130° C.

The resulting multilayer coating exhibits superior solvent resistance, acid resistance and hardness.

EXAMPLE 1

Resin (A) having Epoxy and Hydroxy functionality

A 5 liter reactor equipped with an agitator, straight reflux condenser, thermometer, monomer and initiator addition tanks, and variable heat source is used. The reactor is charged with 912 g methylpropyl ketone and 228 g of butyl acetate, and heated to reflux, 118° C. The monomer addition tank is charged with 240 g butyl acrylate, 838 g butylmethacrylate, 838 g hydroxy ethyl acrylate, and 479 g glycidyl methacrylate. 260 g of tert butyl peroctoate. The monomers and initiators are added to the reactor over 4 hours while maintaining reflux. When the monomers and initiator additions are complete the reaction is held at reflux for an additional 2 hours to complete the polymerization. The reaction is cooled and the polymer is filtered.

EXAMPLE 2

Resin (B) having Anhydride Functionality

A 5 liter reactor equipped with an agitator, straight reflux condenser, thermometer, monomer and initiator addition tanks, and variable heat source is used. The reactor is charged with 520 g methyl propyl ketone and heated to reflux at 105° C. 616 g Maleic anhydride is dissolved in 1000 g methyl amyl ketone. This mixture is charged to the monomer tank in addition to 616 g butyl acrylate, 575 g butylmethacrylate, 41 g acrylic acid, and 205 g styrene.

226 g of tert butyl peroctoate, is charged to the initiator tank. Monomers and initiators are added to the reactor over 4 hours while maintaining reflux. The reflux temperature will slowly increase to 125° C. during the monomer addition. When monomers and initiator additions are complete the reaction is held at reflux for an additional 2 hours to complete the polymerization. The reaction is cooled and the polymer is filtered.

The resulting anhydride functional polymer (B) has a weight average molecular weight of 2400 by gel permeation chromatography, an acid number of 32, an anhydride equivalent weight of 1.65 meq/g and a viscosity of 2.4 dPas.

EXAMPLE 3

Resin (C) for Prior Art

A 5 liter reactor equipped with an agitator, straight reflux condenser, thermometer, monomer and initiator addition tanks, and variable heat source is used. The reactor is charged with 712.3 g primary amyl acetate, 186.0 g of aromatic solvent blend sold under the trade name Aromatic 100 from Exxon, and 77.14 g of cumene hydroperoxide and heated to reflux, 151° C. The monomer tank is charged with 513.4 g butyl acrylate, 847.4 g butyl methacrylate, 898.7 g of hydroxyethyl acrylate, 51.3 g acrylic acid, and 256.9 g styrene.

102.7 g of cumene hydroperoxide, 102.7 g of dicumyl peroxide and 51.4 g of aromatic solvent blend, sold under the trade name Aromatic 100 from Exxon, are charged to the initiator tank. The monomers and initiators are added to the reactor over 4 hours while maintaining reflux. The reflux temperature will slowly increase to 160° C. during the monomer addition. When the monomers and initiator additions are complete the reaction is held at reflux for an additional 2 hours to complete the polymerization. The reaction is cooled and the polymer is filtered.

The resulting hydroxyl functional polymer resin (C) has a weight average molecular weight of 4400 by gel permeation chromatography, a hydroxy number of 169, an acid number of 16, and a viscosity of 13 dPas at 23° C.

EXAMPLE 4

Coating Composition

A coating composition with the following composition by weight:

| Item | WT % | Description |
|---|---|---|
| Resin (A) | 21.9 | Epoxy and Hydroxy functional Resin from Example 1 |
| Resin (B) | 53 | Anhydride resin from Example 2 |
| Cymel 303 | 12.8 | hexamethoxy methyl melamine from American Cyanamid |
| Sanduvar 3206 | 2.3 | Oxanilide UV absorber from Sandoz Color and Chemical |
| Tinuvin 440L sol'n[1] | 2.6 | Hindered Amine Light Stabilizer from Ciba Geigy |
| Polybutyl Acrylate | 0.5 | A620A2 from Cook Paint & Varnish |
| Nacure 5543 | 5.1 | Diisopropylamine blocked Dodecyl Benzene Sulfonic Acid from King Industries |
| Ethylethoxy propionate | 1.8 | |

[1]30% solution of Tinuvin 440L in Xylene

Components are mixed, and adjusted to spray viscosity of 22–28sec. #4 Ford cup with xylene and sprayed with a siphon or pressure pot gun to a film thickness of 1.4–1.9 mils.

EXAMPLE 5

Preparation of coating compositions according to the Prior Art

| | Coating composition for Prior Art | |
|---|---|---|
| Item | WT % | Description |
| Resin (C) | 47.18 | Acrylic Polyol |
| Cymel 303 | 27.00 | hexamethoxy methyl melamine from American Cyanamid |
| polybutyl acrylate | 0.50 | A620A2 from Cool Paint & Varnish |
| Tinuvin 440L sol'n[1] | 2.50 | Hindered Amine Light Stabilizer from Ciba Geigy |
| Sanduvar 3206 | 2.13 | Oxanilide UV absorber from Sandoz Color and Chemical |
| Nacure 5543 | 2.40 | Diisopropylamine blocked Dodecyl Benzene Sulfonic Acid from King Industries |
| Xylene | 18.33 | |

[1]30% solution of Tinuvin 440L in xylene

Components are mixed, and adjusted to spray viscosity of 22–28sec. #4 Ford cup with xylene and sprayed with a siphon or pressure pot gun, to a film thickness of 1.4–1.9 mils, Results

| Test | Coating described in patent | Prior Art |
|---|---|---|
| Tukon (Knoops) | 7.8 | 3.3 |
| MEK Resistance to film failure | 200+ | 160 |
| Acid Spot | 5 | 3 |
| 2000 hours QUV | sl yellowing | film cracking |

Acid Spot Test: 0.5, 1.0, 2.0, and 4.0% Hydrochloric Acid backed on film at 185° F. for 30 minutes
Acid spot rating 1- Poor; 5- Good

I claim:

1. A solvent-borne coating composition consisting essentially of
   A) a resin consisting essentially of epoxy and hydroxy functionality present in an amount between 10 to 35% by weight;
   B) a resin consisting essentially of anhydride functionality present in an amount between 50 to about 75% by weight;
   C) an aminoplast resin present in an amount between 5 to about 20% by weight; and
   D) additives selected from the group consisting of solvents, catalysts, flow agents, hindered amine light stabilizers and ultraviolet absorbers present in an amount between 1 to 15% by weight.

2. A coating composition according to claim 1, wherein component (A) is a polyacrylate resin having epoxy and hydroxy functionality.

3. A coating composition according to claim 1, wherein component (B) is a polyacrylate resin having anhydride functionality.

4. A solvent borne coating composition consisting essentially of
  A) a polyacrylate resin having epoxy and hydroxy functionality consisting essentially of
    $a_1$) about 10 to about 60 % by weight of an ethylenically unsaturated monomer having an epoxy group;
    $a_2$) about 20 to about 50% by weight of an ethylenically unsaturated monomer having a hydroxy group;
    $a_3$) about 20 to about 65% by weight of other ethylenically unsaturated monomers;
  B) a polyacrylate resin having anhydride functionality consisting essentially of
    $b_1$) about 20 to about 50% by weight of an ethylenically unsaturated monomer with an anhydride group; and
    $b_2$) about 50 to about 80% by weight of other ethylenically unsaturated monomers;
  C) an aminoplast resin; and
  D) additives selected from the group consisting of solvents, catalysts, flow agents, hindered amine light stabilizers and ultraviolet absorbers.

5. A coating composition according to claim 4, wherein component ($a_1$) is selected from the group consisting of glycidylacrylate, glycidylmethacrylate and mixtures thereof.

6. A coating composition according to claim 4, wherein component ($a_2$) is selected from the group consisting of hydroxyethylacrylate, hydroxyethylmethacrylate, hydroxypropylacrylate, hydroxypropylmethacrylate, hydroxybutylacrylate, hydroxybutylmethacrylate and mixtures thereof.

7. A coating composition according to claim 4, wherein component ($b_1$) is selected from the group consisting of maleic anhydride, itaconic anhydride and mixtures thereof.

8. A method of coating a substrate with multiple layers of coatings comprising applying the coating composition according to claim 1 as a clearcoat on a basecoat.

9. A substrate coated with at least one coating composition according to claim 1 as a topcoat.

* * * * *